UNITED STATES PATENT OFFICE.

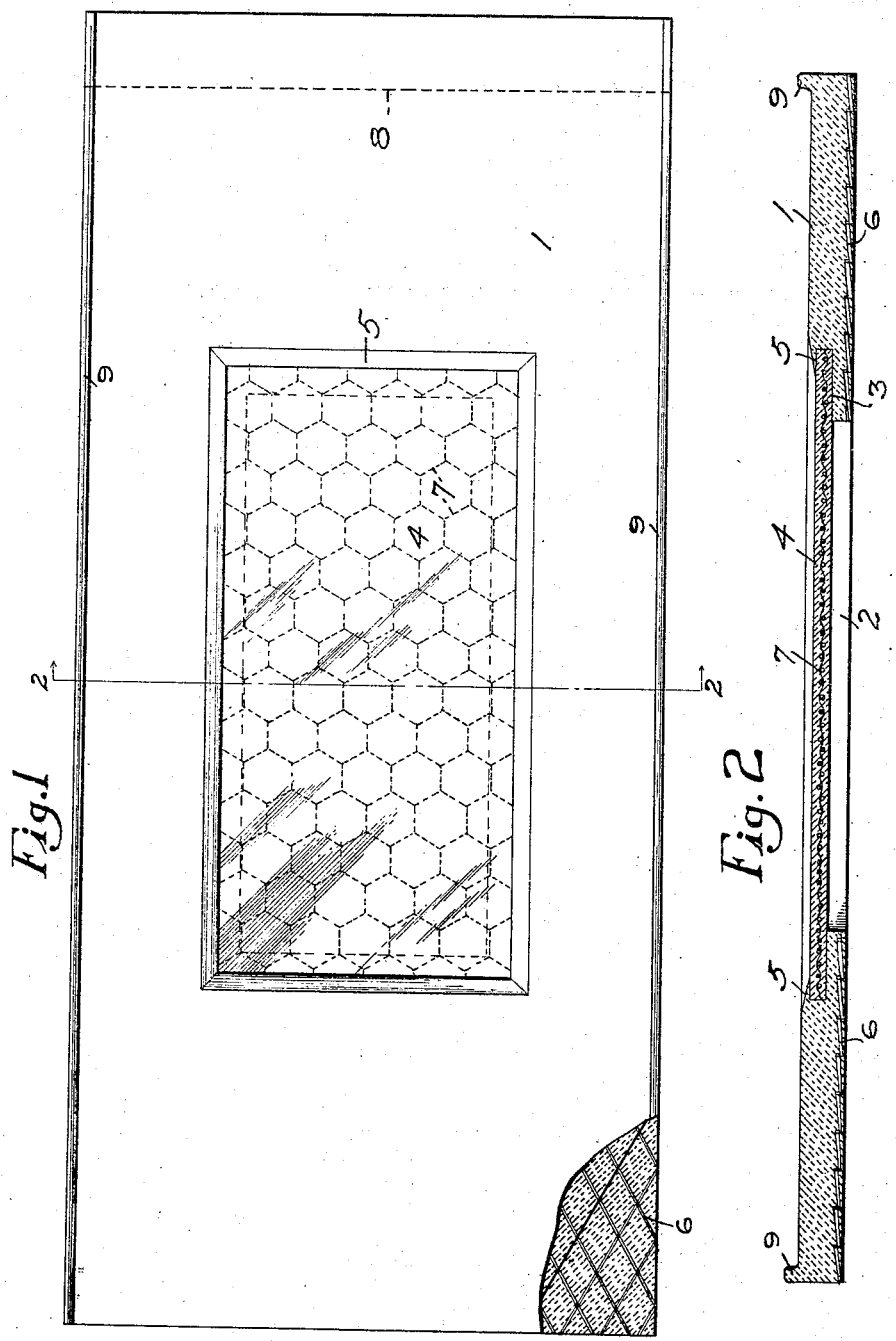

IGNATZ H. FREUND, OF BEAVER, PENNSYLVANIA.

CEMENT TILE WITH LIGHT-PANE.

No. 860,796.  Specification of Letters Patent.  Patented July 23, 1907.

Application filed December 3, 1906. Serial No. 346,089.

*To all whom it may concern:*

Be it known that I, IGNATZ H. FREUND, a resident of Beaver, in the county of Beaver and State of Pennsylvania, have invented a new and useful Improvement in Cement Tiles with Light-Panes; and I do hereby declare the following to be a full, clear, and exact description thereof.

This invention relates to illuminating tiles and more especially to tiles used for roofing purposes.
The invention comprises a cement or concrete tile having a comparatively thin and light body with a sheet of glass embedded therein, all as hereinafter described and claimed.

In the accompanying drawing, Figure 1 is a plan view, partly broken away, of my improved tile, and Fig. 2 is a section thereof on the line 2—2, Fig. 1.

My invention comprises a tile having a body 1 of comparatively large superficial area and comparatively thin, the body 1 thereof being formed of cement or concrete and provided with a large opening 2, which is surrounded by a ledge 3 upon which is seated a sheet of glass 4. The edges of this sheet are embedded in the cement and held in place by adhesion, being put in place when the tile is molded so that it practically becomes integral with the cement. As an additional precaution, a portion of the cement, as at 5, is worked over the top or outer face of the glass so as to more securely hold the same in position. This cement portion is sloped or beveled, as shown, so as to provide a comparatively flat outer or upper surface and thus prevent the lodgment of rain or snow.

The tile body may be composed only of cement but to give additional strength and prevent pieces from falling if the tile should crack, it is preferred to embed in the cement body metal or similar reinforcement, such as the expanded metal shown at 6. For similar reasons the sheet of glass 4 may be reinforced by having embedded therein a metal trellis 7, such glass being what is ordinarily known as wire glass.
The tile is formed with interlocking portions for attachment of one tile to the adjacent ones and also suitable means for hooking over or otherwise attaching to the roof purlins or frame members.

The tile shown in the drawing is provided at one end on its lower face with the hook member, indicated by the dotted line 8, for hooking over the roof purlins, and at its edges is provided with ridges 9 for receiving the interlocking member. Inasmuch, however, as these features may be varied within wide limits, and are not claimed, they are not shown in detail. The tile may, if desired, be made without these interlocking features.

The tile described is intended more especially for bridging large openings, such as forming roofs of buildings, such as shops and factories, through which it is desired to obtain light. The tile body is of comparatively large superficial area and comparatively thin and the glass sheet likewise is comparatively large and thin. One dimension made has the body of the tile 52″ long, 24″ wide and ¾″ thick, and the glass sheet 22″ long, 10″ wide and about 5/16″ thick. The tile, therefore, is strictly speaking, a slab and not a block and the glass is, strictly speaking, a sheet.

I am aware that heretofore illuminating tiles have been made but in all cases, so far as I am aware, the tile required some metal frame or frame members in order to support the same or else the bodies thereof have been of comparative small superficial area and comparatively great thickness and the glass has been practically in the form of a thick block and usually held in place by metal members. My tile differs radically therefrom as is apparent from the foregoing description.

The cement and glass have practically identical coefficients of expansion and, as the glass is embedded in the cement while the latter is being molded, a very close adhesion or bond is formed between the two. The glass and cement practically become one integral mass and the glass cannot be removed without destroying the body of the tile.

The tile described is a combination of cement and glass and is or may be an exact counterpart of the standard roofing tiles and formed to interlock with the same as does any other roofing tile. This tile is capable of being provided with hooks to take over the roof purlins and to interlock with the standard roof plates, being laid loosely so that it will take up expansion and contraction as well as vibration. The tile itself, and also the glass, while comparatively thin, are reinforced in a manner to expose no metallic portions on the surface and no metal frame is required to carry either the tile or the glass. The latter is carried entirely by the cement body. The surface of the tile is comparatively even and has no projecting portions to stop the rain or snow so that it is practically self-cleaning and enables the glass to give maximum light. It is unnecessary to flash the tiles themselves or the glass in the tile in order to make a water tight joint. When wire glass is used the tile is practically fire proof, as the glass is embedded in the cement and becomes an integral part of the latter.

What I claim is:

1. An illuminating tile comprising a thin slab of cement provided with a large opening, and a sheet of glass covering said opening and having its edges embedded directly in the cement body and held in place by the setting of the cement around the edges of the glass.

2. An illuminating tile comprising a thin concrete slab provided with a large opening having a rabbet surrounding the same, and a sheet of glass seated directly on said rabbet and molded in the cement, being held in place by the setting of the cement around the edges of the glass.

3. An illuminating tile comprising a thin cement slab provided with a large opening having a rabbet surrounding the same, and a sheet of glass resting on said rabbet, a portion of the cement body being molded over the outer surface of the glass.

4. An illuminating tile comprising a thin slab of cement having metal reinforcement embedded therein and provided with an opening, and a sheet of glass covering said opening and having its edges embedded directly in the cement and held therein by the setting of the cement around the edges of the glass.

5. An illuminating tile comprising a thin cement slab provided with a large opening, and a sheet of wire glass covering said opening and having its edges embedded directly in the cement and held therein by the setting of the cement around the edges of the glass.

6. An illuminating tile comprising a thin slab of cement having metal reinforcement embedded therein and having a large opening, and a sheet of wire glass covering said opening and having its edges embedded directly in the cement and held therein by the setting of the cement around the edges of the glass.

In testimony whereof, I the said IGNATZ H. FREUND have hereunto set my hand.

IGNATZ H. FREUND.

Witnesses:
A. S. LOWENTHAL,
JOHN N. BECKMAN.